April 14, 1931.  J. MILLER  1,800,466
TRUNK RACK
Filed Jan. 31, 1930    2 Sheets-Sheet 1
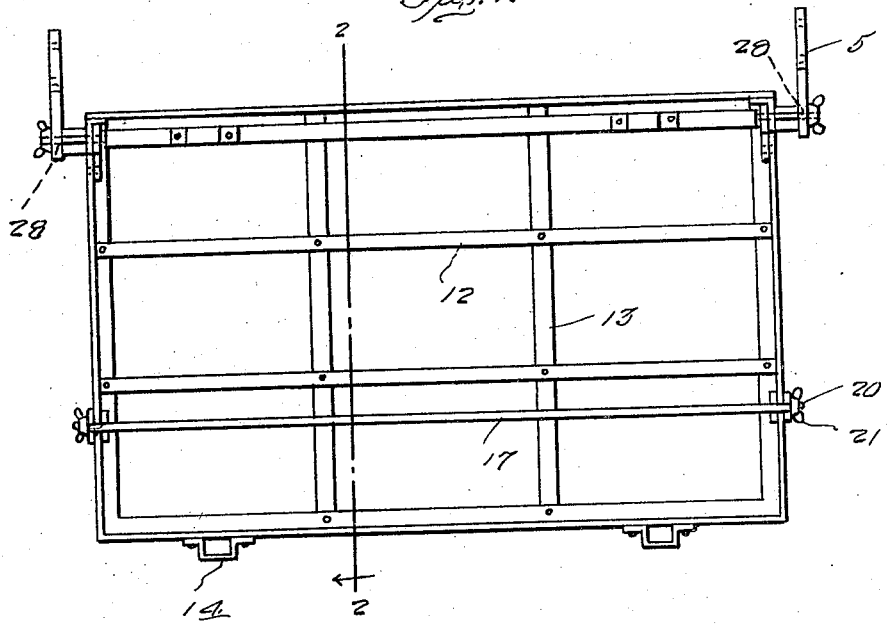
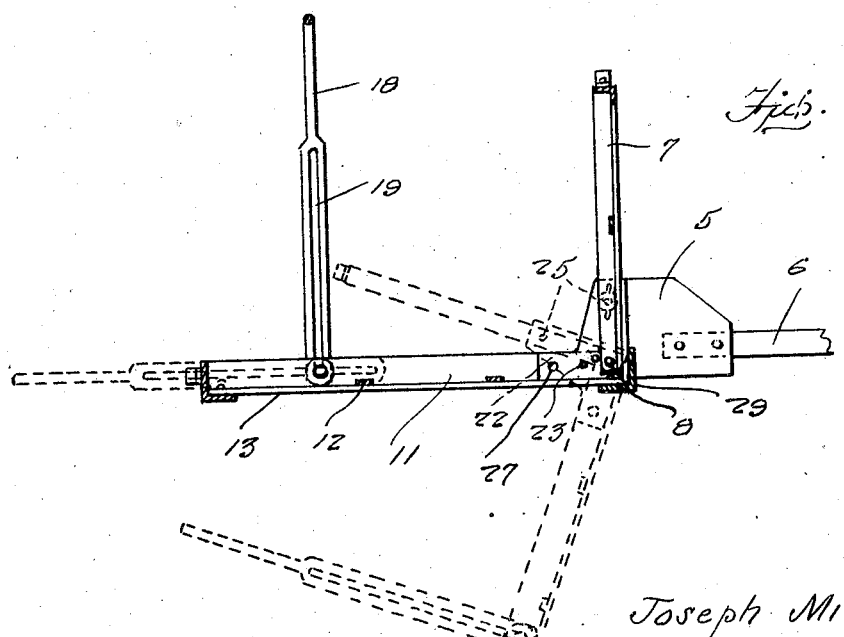
Inventor
Joseph Miller
By Clarence A. O'Brien
Attorney April 14, 1931.  J. MILLER  1,800,466
TRUNK RACK
Filed Jan. 31, 1930    2 Sheets-Sheet 2
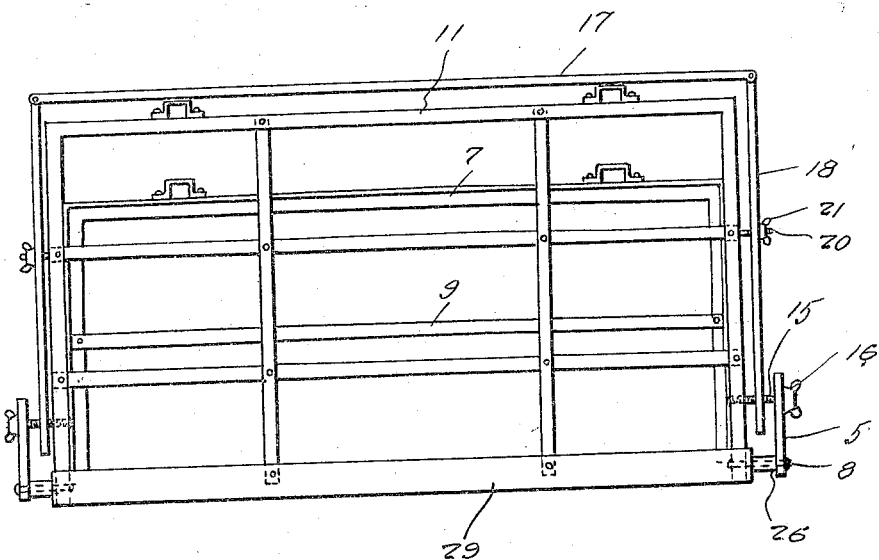
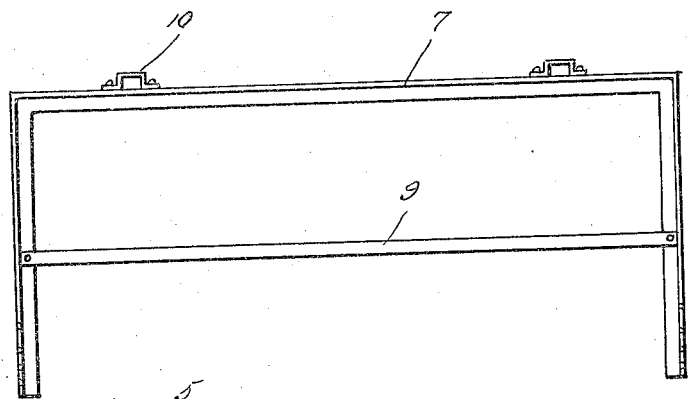
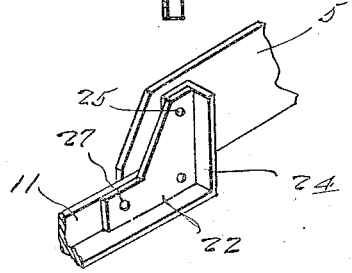
Inventor
Joseph Miller
By Clarence A. O'Brien
Attorney Patented Apr. 14, 1931

1,800,466

UNITED STATES PATENT OFFICE

JOSEPH MILLER, OF BROOKLYN, NEW YORK, ASSIGNOR TO UNIVERSAL LUGGAGE CARRIER INC., OF BROOKLYN, NEW YORK, A CORPORATION OF NEW YORK

TRUNK RACK

Application filed January 31, 1930. Serial No. 424,929.

The present invention relates to trunk racks for automobiles and has for its principal object to provide a device of this character attachable at the rear of the automobile and capable of swinging downwardly, when either loaded or unloaded to afford access to the spare tire, usually carried also at the rear of the vehicle.

A further object of the invention is to provide a trunk rack having means for securing various types of luggage thereon which is adjustable upon the rack so as to tightly secure the luggage in position at all times.

A still further object is to provide a trunk rack which may be folded upwardly at the rear of the automobile in a compact manner when not in use.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1 is a top plan view,

Figure 2 is a sectional view taken along a line 2—2 of Figure 1,

Figure 3 is a rear elevational view showing the rack in upwardly folded position, Figure 4 is a detail, in elevation, of the inwardly disposed section of the rack, Figure 5 is a fragmentary perspective view of the angle plates for the horizontal rack section.

Referring now to the drawings in detail for the purpose of illustration I have disclosed a preferred embodiment of the invention which includes a pair of attaching brackets 5 extending outwardly from the rear end of an automobile and attachable thereto by brace rods 6.

The trunk rack comprises an inner upright frame 7 of the U-shaped construction and invertedly arranged with its lower end pivotally attached to the brackets 5 by pins 8. The legs of the section 7 are connected by a horizontal brace 9 and the upper edges of the rear section 7 are provided with strap attaching brackets 10.

The pins 8 also provide a pivotal mounting for a horizontal rack section 11, which is likewise of substantially U-shaped formation with its ends pivotally mounted on the pins 8 at the lower ends of the legs of the rack section 7 and outwardly thereof. The horizontal rack section 11 is provided with intersecting transverse and longitudinal braces 12 and 13 respectively.

The outer edge of the horizontal section 11 is also provided with strap attaching brackets 14. The rack sections 7 and 11 are constructed of angle iron with the lower end of the leg of the rack section 7 rounded to permit the folding of the sections with respect to each other.

A U-shaped clamping member 17 is carried by the horizontal rack section 11, adjacent its outer end, said clamping member being invertedly positioned with the lower portion of its legs 18 formed with longitudinally extending slotted openings 19 and positioned outwardly of the sides of the rack section 11.

Bolts 20 extend outwardly from the sides of the horizontal rack section for insertion through the slotted openings 19 of the legs for securing the member in vertically adjusted position with respect to the rack section by wing nuts 21. Accordingly the clamping member 17 may be placed transversely over the top of a trunk or other luggage placed upon the horizontal rack section 11 for firmly securing the luggage in position thereon.

The clamping member 17 may be removed from the section 11 and inserted through the handles of suitcases or the like which are mounted on the section 11 after which the legs 18 are again connected to said section 11.

The inner pivoted ends of the horizontal rack section are bent angularly as shown at 24 and with the angle thus formed are attached angle plates 22 by rivets or the like 23, the plates extending upwardly and terminating at a plane with the angular end 24 of the rack as more clearly shown in Figure 5. Openings 25 and 27 are formed in the plates 22 and in the angular end 24 and the sides of the rack section for receiving screws 15 threaded through openings 28 in the brackets 5 when the horizontal section of the rack is placed in either its normal or folded position. The screws 15 are also inserted in the slotted openings 19 of the clamping member when the latter is folded along a plane corresponding to that of the horizontal member for securing the parts in upwardly folded position as shown in Figure 3.

Spacing sleeves 26 are carried on the bolts or rivets 8 to uniformly space the side edges of the rack inwardly of the brackets 5 to provide for the folding of the horizontal rack section. An angle strip 29 connects the inner pivoted ends of the horizontal rack section to brace the same.

Having thus described my invention, what I claim as new is:

A luggage rack for vehicles comprising a pair of vehicle attaching brackets, an upright rack section pivotally connected to the brackets, a horizontal rack section pivotally connected to the brackets, a pair of plates fixedly carried at the opposite sides of the horizontal section, said brackets, said upright section and said plates each having openings, the openings in the upright section and the openings in the plates being aligned with each other for removably receiving bolts, wing nuts on the bolts for rigidly securing the rack sections against pivotal movement and a detachable U-shaped luggage clamping member invertedly carried by the horizontal rack section, said member having its legs pivotally connected for longitudinal alinement with each other to facilitate insertion through the luggage handles and a pin and slot connection for the ends of the legs for adjustably and detachably securing the clamping member to the rack.

In testimony whereof I affix my signature.

JOSEPH MILLER.